Nov. 5, 1946.  R. B. DOME  2,410,721

PHASE SHIFTING CIRCUIT

Filed Nov. 30, 1942

Inventor:
Robert B. Dome,
by Harry E. Dunham
His Attorney.

Patented Nov. 5, 1946

2,410,721

UNITED STATES PATENT OFFICE 2,410,721

PHASE SHIFTING CIRCUIT

Robert B. Dome, Bridgeport, Conn., assignor to General Electric Company, a corporation of New York Application November 30, 1942, Serial No. 467,421

5 Claims. (Cl. 172—238)

My invention relates to electric circuits and more particularly to electric circuits for shifting the phase of an alternating potential derived from a source with respect to the potential of that source.

While my invention is of general application in electric control and regulating systems, it is particularly adapted for use in connection with the sweep circuit of a cathode ray tube. In such applications, particularly when used in pulse systems, it is desirable to control the starting time of a trace so that a selected image appears at the beginning of a trace and facilitates comparison with other images. In order that this result be obtained, it is essential that the phase shifting device have a range of substantially 360 electrical degrees.

It is an object of my invention to provide a new and improved electric phase shifting circuit.

It is a further object of my invention to provide an improved electric phase shifting circuit in which the output voltage may be varied through 360 electrical degrees relative to the input voltage with substantially no change in relative magnitudes.

Another object is to provide an improved electric phase shifting circuit which is simple in assembly and operation and the component elements of which are standard electrical circuit elements and which may be replaced in the field with relatively little difficulty.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 diagrammatically illustrates an embodiment of my invention as applied to the sweep circuit of a cathode ray tube and Fig. 2 represents certain operating characteristics thereof.

Figure 1:
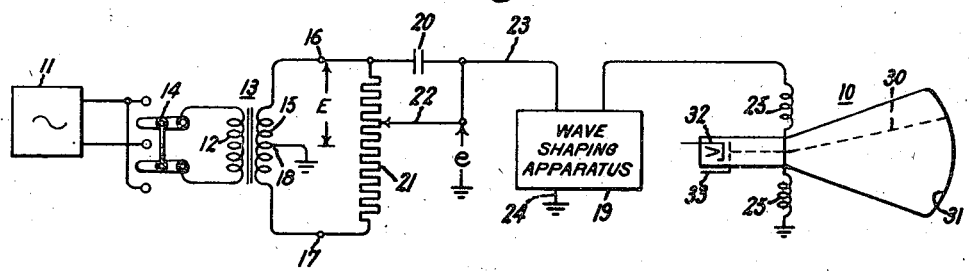
Figure 2:
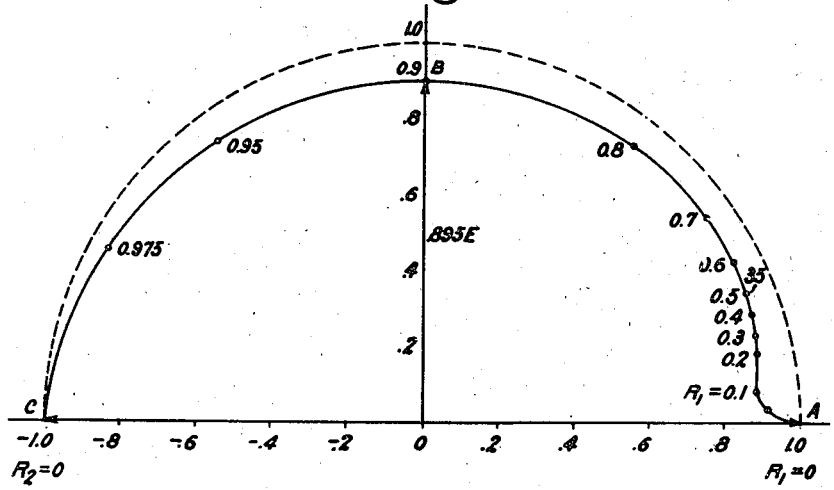

Fig. 1 of my invention is diagrammatically illustrated as applied to the sweep circuit of the cathode ray tube 10. The voltage for this circuit is supplied from a source of sinusoidal oscillations 11, the frequency of the source 11 preferably being of a value ordinarily used for such circuits and lying in range between 325 and 650 cycles.

The scanning voltages from the source 11 are impressed upon the primary winding 12 of the transformer 13 through a phase reversing switch 14. The switch 14, preferably, is of the double-pole, double-throw type and its use in my phase shifting circuit is explained in detail later. The secondary winding 15 of the transformer 13 has a pair of terminal connections 16 and 17 and an electrically intermediate connection, or center tap, 18, the latter being connected to ground. The terminal 16 of the secondary winding 15 is connected to the input of the wave shaping apparatus 19 through capacitor 20. The wave shaping apparatus 19 may be of a type commonly used in deriving a wave form desired for sweep circuits of cathode ray tubes and may comprise, for example, means for clipping the top and bottom of the sine wave impressed across the input of the apparatus to derive a square wave therefrom, means for integrating the square wave and generating therefrom a saw-tooth wave, and means for amplifying this saw-tooth wave prior to impressing it across the sweep coils 25 of the cathode ray tube 10.

Also connected to the terminal 16 is a potentiometer or resistance 21 having its other end connected to the terminal 17 of secondary winding 15. The potentiometer 21 has a movable contact or slider 22 which is directly connected to the conductor 23 between capacitor 20 and the input of the apparatus 19. The return circuit for the apparatus 19 is connected to ground by conductor 24 and the output of apparatus 19 is directly connected to the sweep coils 25 of cathode ray tube 10.

The cathode ray tube may be of any well known form and the details thereof form no part of my invention. Briefly, means are provided therein for developing and projecting an electron ray 30 against fluorescent screen 31 at the end of the tube envelope. The intensity of the ray 30 emanating from the cathode 32 is controlled by the potential applied to the control electrode 33. The ray is caused to scan the target in a horizontal plane in well known manner through the action of the sweep coils 25 supplied with scanning potential from the source 11. When the tube 10 is used in a pulse signalling system of the radio echo type, for example, and is used in conjunction with a rotating antenna of such a system, the coils 25 may be rotated about the neck portion of the tube 10 to effect scanning at different azimuth angles corresponding to the position of such an antenna.

The operation of the embodiment of my invention shown in Fig. 1 will be explained by considering the voltage supplying circuit when the sweep or scanning potential is being transmitted from the source 11 to the coils 25 through transformer 13 and apparatus 19. With the switch 14 thrown to the left, the voltage across one-half of the secondary winding 15, that is, between the terminal 16 and ground, may be represented as E volts. The voltage $e$ impressed across the input of apparatus 19, that is, between movable contact 22 and ground, can be shown mathematically to be $$(1) \quad e = E\left[\frac{R_1^2 R_2^2 - X^2(R_1^2 - R_2^2) + 2jXR_1^2 R_2}{R_1^2 R_2^2 + X^2(R_1 + R_2)^2}\right]$$

where $X$ = the reactance of capacitor 20,
$R_1$ = that portion of potentiometer 21 above the contact 22, and
$R_2$ = that portion of potentiometer 21 below the contact 22.

To those skilled in the art, it is at once apparent that the phase shift obtained for any setting of the movable contact 22 may be determined from $$(2) \quad \phi = \tan^{-1}\left[\frac{2XR_1^2 R_2}{R_1^2 R_2^2 - X^2(R_1^2 - R_2^2)}\right]$$

Since the value of the reactance $X$ of capacitor 20 is finite when contact 22 is at the upper point of potentiometer 21 and electrically is directly connected to terminal 16, the value of $R_1$ is zero and the value of $\phi$ is also zero degrees. Under such conditions, the voltage $e$ is in phase with the voltage $E$. As contact 22 is moved down potentiometer 21 and $R_1$ is increased, a phase shift of 90° is obtained when the denominator of Equation 2 passes through zero. Finally, when the movable contact 22 arrives on the lowermost portion of potentiometer 21 and electrically is directly connected to terminal 17, $R_2$ becomes zero and the value of $\phi$ is 180°. Thus, in the movement of contact 22 between terminals 16 and 17, a shift of 180° is obtained. If switch 14 be now thrown to its right-hand position, a second shift of 180° may be obtained. Thus, for the two positions of switch 14, the output voltage of the phase shift circuit which is impressed upon the input of apparatus 19 may be varied through 360 electrical degrees relative to the input voltage.

The variation of amplitude of the output voltage of the phase shift circuit may best be illustrated by consideration of practical values for potentiometer 21 and capacitor 20. If, for example, the value of $X$, the reactance of capacitor 20, is 100,000 ohms and the value of resistor 21 is 1 megohm, it is seen from Equation 1 that the maximum value of $e$ is $E$ and the minimum value, approximately .895 $E$. This represents a voltage drop of but 10½ per cent and for practical purposes, the output voltage of the phase shift circuit is maintained substantially constant in magnitude. Furthermore, if the size of capacitor 20 is doubled, the minimum value of $e$ becomes approximately .95 $E$. It is to be observed that this increase in constancy of amplitude is obtained at a sacrifice of linearity in the operation of the phase shift control.

For explanation of this effect, reference is made to the curve of Fig. 2 in which the full-line curve shows certain operating characteristics of the phase shifting circuit and the broken-line curve is a semicircle having a radius OA. When the movable contact 22 is at the top of potentiometer 21, the voltage $e$ may be represented by the vector OA. The voltage OB, which represents a shift of 90°, is obtained, as explained above, when the denominator of (2) is zero. A secondary maximum point 35 appears in the amplitude of the output voltages between positions OA and OB and occurs near the point where resistance $R_1$ is equal to $R_2$, that is, substantially at the middle of the movement of contact 22. Ultimately when contact 22 reaches the lowermost position on potentiometer 21 and the value of $R_2$ is zero, the voltage $e$ has shifted 180° and may be represented by the vector OC. Other values of $e$ for positions of contact 22 between the ends of resistor 21 are indicated by the remaining points shown on the full-line curve, the ratio of resistance $R_1$ to the resistance 21 being indicated for each of the points. For the practical values mentioned previously, it should be noted that the greatest variation in phase occurs during approximately the last 10 per cent of movement of contact 22. Thus, the change in $e$ from the value OA to the value OB occurs during approximately the first 90 per cent of movement of contact 22, while the shift from OB to OC is effected during the last 10 per cent of the contact movement. This lon-linear relation between shift of phase and variation in position of contact 22 may be avoided by the use of a logarithmic type of resistor for potentiometer 21, that is, a resistor whose effective resistance does not vary linearly with movement of contact 22, but instead varies substantially in accordance with a logarithmic curve, and 10 per cent of the resistance lies in the lower half of the resistance 21 and the remaining 90 per cent in the upper half of resistance 21.

It is thus seen that my invention provides a phase shift circuit effective to shift the phase of its output voltage through 360 electrical degrees relative to the alternating voltage impressed across its input circuit while maintaining the output voltage substantially constant in magnitude. The component elements of my phase shift circuit are readily available and are easily assembled. In the operation of phase shift circuits employing variable resistors, the greatest percentage of trouble is occasioned by failure of the resistors used for the potentiometer 21. As a result of providing a phase shift circuit in which the resistance 21 is of the ordinary two-end control type, having only the two contacts at the end of the resistor and no intermediate taps to be connected, it may easily be replaced in the field with relatively little difficulty.

While I have shown a certain application of my invention, it will be apparent that modifications may be made. Thus, instead of the apparatus 19 and the cathode ray tube 20, any other type of utilization circuit may be employed in conjunction with my phase shift circuit. Also, where a shift of 180 electrical degrees is sufficient, the phase reversing switch 14 may be omitted. Thus, while I have shown particular embodiments of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States is:

1. In combination, a source of alternating voltage having a pair of output terminals balanced with respect to ground, a load connected between ground and one terminal of said source through a reactance, an impedance having two terminal connections, one of said terminal connections being connected to said source and said reactance and said one terminal and the other of said terminal connections being connected solely to the other of said terminals, and a contact connected to a point between said reactance and load and movable along said impedance to vary the phase of voltage supplied from said source to said load.

2. In combination, an alternating current circuit, apparatus for producing an alternating voltage variable in phase relative to the voltage of said alternating current circuit and of substantially constant magnitude and comprising an impedance in said circuit having a pair of terminals and an electrically intermediate connection, a resistance connected between said terminals and having a movable contact, a capacitor connected between one of said terminals and said movable contact, the other of said terminals being connected solely to said circuit, and an output circuit connected between said intermediate connection and said movable contact, whereby movement of said contact between said terminal connections is effective to shift the phase of the alternating voltage impressed across said output circuit through 180 electrical degrees.

3. In combination, an alternating current circuit, apparatus for producing an alternating voltage variable in phase relative to the voltage of said alternating current circuit comprising a winding energized from said circuit and having a pair of terminal connections and an electrically intermediate connection, a resistance connected between said terminal connections and having a movable contact, a capacitor connected between one of said terminal connections and said movable contact, the other of said terminal connections being connected solely to said resistance, and an output circuit connected across said intermediate connection of said winding and said contact of said resistance, whereby movement of said contact between said terminal connections is effective to shift the phase of the alternating voltage impressed across said output circuit through 180 electrical degrees.

4. A voltage supply for the sweep circuit of a cathode ray tube comprising, a source of alternating voltage, means for impressing across said circuit a voltage derived from said source, and means for shifting the phase of said derived voltage relative to the voltage of said source comprising, a winding energized from said source and having a pair of terminal connections and an electrically intermediate connection, a resistance connected between said terminal connections and having a movable contact, a capacitor connected between one of said terminal connections and said movable contact, the other of said terminal connections being connected solely to said resistance, and means connecting said circuit across said intermediate connection of said winding and said movable contact.

5. In a voltage supply for a cathode ray tube having a sweep circuit, a source of sinusoidal voltage, and means for deriving a voltage therefrom for impressing across said sweep circuit, means for adjustably shifting the phase of said derived voltage relative to the voltage of said source comprising, a winding energized from said source and having a pair of terminal connections and an electrically intermediate connection, a resistance connected between said terminal connections and having a movable contact, a capacitor connected between one of said terminal connections and said movable contact, the other of said terminal connections being connected solely to said resistance, and output terminals connected to said intermediate connection of said winding and said movable contact.

ROBERT B. DOME.